(12) United States Patent
Takatsuji

(10) Patent No.: US 9,337,518 B2
(45) Date of Patent: May 10, 2016

(54) BATTERY STATE MONITORING DEVICE AND BATTERY MODULE HAVING THE SAME

(71) Applicant: MITSUBISHI HEAVY INDUSTRIES, LTD., Tokyo (JP)

(72) Inventor: Hideyasu Takatsuji, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 147 days.

(21) Appl. No.: 14/103,898

(22) Filed: Dec. 12, 2013

(65) Prior Publication Data

US 2014/0176141 A1    Jun. 26, 2014

(30) Foreign Application Priority Data

Dec. 21, 2012   (JP) ................................ 2012-280000

(51) Int. Cl.
| | | |
|---|---|---|
| *G01N 27/416* | (2006.01) | |
| *H02J 7/00* | (2006.01) | |
| *H02H 7/18* | (2006.01) | |
| *H01M 2/00* | (2006.01) | |
| *H01M 10/48* | (2006.01) | |
| *H01M 2/28* | (2006.01) | |
| *H01M 2/08* | (2006.01) | |

(52) U.S. Cl.
CPC ................................... *H01M 10/486* (2013.01)

(58) Field of Classification Search
CPC ................................................... H01M 10/486
USPC ........... 320/104; 324/426; 429/64, 90, 91, 92, 429/93, 121, 163, 175, 178; 307/10.7
See application file for complete search history.

(56) References Cited

U.S. PATENT DOCUMENTS

| 5,612,659 A * | 3/1997 | Kerber ..................... H02H 7/18 307/10.7 |
|---|---|---|
| 2013/0029192 A1* | 1/2013 | Oya ..................... H01M 2/1072 429/61 |

FOREIGN PATENT DOCUMENTS

| CN | 101872880 A | 10/2010 |
|---|---|---|
| CN | 102738534 A | 10/2012 |
| JP | 3-61393 U | 6/1991 |

(Continued)

OTHER PUBLICATIONS

Japanese Office Action dated Sep. 24, 2014, issued in corresponding Japanese Application No. 2012-280000; w/English Translation. (4 pages).

(Continued)

*Primary Examiner* — Richard V Muralidar
(74) *Attorney, Agent, or Firm* — Westerman, Hattori, Daniels & Adrian, LLP

(57) ABSTRACT

A battery state monitoring device includes a substrate in which a through-hole disposed to be opposite to a safety valve of a battery is formed, a sensor which includes a positive electrode end and a negative electrode end and which is provided on the substrate, a first interconnector which is connected to the positive electrode end of the sensor on the substrate and which is disposed to pass along a part of a periphery of the through-hole, and a second interconnector which is connected to the negative electrode end of the sensor on the substrate and which is disposed to pass along a part of the periphery of the through-hole. The first interconnector and the second interconnector are disposed to extend along each other at the periphery of the through-hole.

14 Claims, 6 Drawing Sheets

(56) References Cited

FOREIGN PATENT DOCUMENTS

| | | |
|---|---|---|
| JP | 2003-86990 A | 3/2003 |
| JP | 2004-006213 A | 1/2004 |
| JP | 2008-226744 A | 9/2008 |
| JP | 2008-235862 A | 10/2008 |
| JP | 2010-80135 A | 4/2010 |
| JP | 2011-096699 A | 5/2011 |
| JP | 2011-216401 A | 10/2011 |
| JP | 2012-9411 A | 1/2012 |
| JP | 2012-177589 A | 9/2012 |
| WO | 2012137289 A1 | 10/2012 |

OTHER PUBLICATIONS

Office Action dated Aug. 5, 2015, issued in counterpart Chinese Patent Application No. 201310641779.0, with English translation (16 pages).

Notice of Allowance dated May 19, 2015, issued in counterpart Japanese application No. 2012-280000 (w/English translation) (6 pages).

\* cited by examiner # BATTERY STATE MONITORING DEVICE AND BATTERY MODULE HAVING THE SAME

BACKGROUND OF THE INVENTION

1. Field of the Invention

The present invention relates to a battery state monitoring device and a battery module having the same.

Priority is claimed on Japanese Patent Application No. 2012-280000, filed on Dec. 21, 2012, the content of which is incorporated herein by reference.

2. Description of Related Art

In a secondary battery such as a lithium ion battery, it is necessary to measure a voltage between terminals, the battery temperature, or the like so as to allow the secondary battery to operate normally and safely. In addition, on the basis of the measured results, a battery charge and discharge control or a control of transitioning a voltage and a temperature in a normal range is carried out.

Here, as a device of measuring a battery temperature, a device including a substrate that is disposed to block an upper side of a safety valve of a battery, a thermistor that is provided to the substrate and is disposed to come into contact with a battery case, and a connector that is provided to the substrate is suggested (refer to Patent Document 1). In addition, an interconnector that connects the thermistor and the connector is provided on the upper surface of the device.

PRIOR ART DOCUMENT

Patent Document

Patent Document 1: Japanese Unexamined Patent Application, First Publication No. 2012-177589

SUMMARY OF THE INVENTION

Problem to be Solved by the Invention

When a battery enters an abnormal state such as an overcharge state or overcurrent state due to improper use or a breakdown of a control circuit, a high-temperature gas accumulated inside the battery enters a state of being blown out from a safety valve provided at an upper portion of a battery cover. If the battery enters this state, in the device described in Patent Document 1, the upper side of the safety valve is blocked by a substrate, and thus the high-temperature gas is not blown out to the upper side, and has an adverse effect on other adjacent batteries due to blowing back at the substrate.

On the other hand, it is preferable that electronic noise from the outside does not interfere with signals transmitted from a sensor on the substrate to stably carry out signal propagation.

An object of the invention is to provide a battery state monitoring device which is capable of reducing noise from the outside while suppressing an effect on other batteries due to a gas blown out from the inside of a battery when the battery enters an abnormal state, and a battery module having the battery state monitoring device.

Means for Solving the Problem

According to a first aspect of the invention, a battery state monitoring device includes a substrate in which a through-hole disposed to be opposite to a safety valve of a battery is formed, a sensor which includes a positive electrode end and a negative electrode end and which is provided on the substrate, a first interconnector which is connected to the positive electrode end of the sensor on the substrate and which is disposed to pass along a part of a periphery of the through-hole, and a second interconnector which is connected to the negative electrode end of the sensor on the substrate and which is disposed to pass along a part of the periphery of the through-hole. The first interconnector and the second interconnector are disposed to extend along each other at the periphery of the through-hole.

In the battery state monitoring device, the through-hole is formed in the substrate to be opposite to the safety valve. Accordingly, in a case where a high-temperature gas is blown out from the safety valve of a battery, the gas flows to an upper side toward a side opposite to the battery through the through-hole, and thus an adverse effect to other adjacent batteries and the like can be suppressed.

In addition, the first interconnector connected to the positive electrode end of the sensor and the second interconnector connected to the negative electrode end of the sensor are disposed to extend along each other at the periphery of the through-hole. According to this, the direction of current flow through the first interconnector and a direction of a current flow through the second interconnector become opposite to each other. Accordingly, directions of magnetic fields in the first interconnector and the second interconnector which occur due to the same noise become opposite to each other and cancel each other out, and thus noise can be reduced.

According to a second aspect of the invention, the first interconnector, the second interconnector, and the sensor may be provided on a surface on a battery side between front and rear surfaces of the substrate.

In this battery state monitoring device, an effect of noise from a side opposite to the battery can be suppressed in the substrate to the minimum, and thus noise can be reduced.

According to a third aspect of the invention, the battery state monitoring device may further include a connector which is provided to the substrate on a side opposite to the sensor with the through-hole interposed between the connector and the sensor. A first end of the first interconnector may be connected to the positive electrode end of the sensor, and a second end of the first interconnector may be connected to the connector. A first end of the second interconnector may be connected to the negative electrode end of the sensor, and a second end of the second interconnector may be connected to the connector.

In this battery state monitoring device, the majority of the first interconnector and the majority of the second interconnector are disposed in parallel with each other from the sensor to the connector. Accordingly, an effect of noise that occurs on the interconnections can be suppressed to a minimum, and thus noise can be reduced.

According to a fourth aspect of the invention, the substrate may include a shield layer that is formed of an electrically conductive material.

In this battery state monitoring device, the substrate is formed of an electrically conductive material capable of shielding an electric field and a magnetic field, and thus noise from the outside can be reduced.

According to a fifth aspect of the invention, the sensor may be a thermistor including a resistive element in which a resistance value varies in accordance with a temperature.

In this battery state monitoring device, a temperature may be known on the basis of a resistance value of the sensor, and thus a temperature can be measured.

According to a sixth aspect of the invention, the substrate may have a tubular portion that extends from the periphery of the through-hole toward the opposite safety valve.

In this battery state monitoring device, in a case where a gas is blown out from the safety valve of the battery, the gas passes through the tubular portion and flows from the through-hole toward a side opposite to the battery, and thus an adverse effect on other adjacent batteries and the like can be suppressed.

According to a seventh aspect of the invention, the substrate is formed with a terminal insertion hole through which the electrode terminal is inserted, and a fixing unit which is formed of a thermally conductive material is provided at the periphery of the terminal insertion hole, which comes into contact with the electrode terminal in a state in which the electrode terminal is inserted through the terminal insertion hole, and to which the electrode terminal is attached. The sensor may be fixed to the substrate and may measure a temperature of the electrode terminal through the fixing unit.

In this battery state monitoring device, when the electrode terminal is inserted through the terminal insertion hole formed in the substrate, the fixing unit comes into contact with the electrode terminal, and the battery state monitoring device is attached to the battery. In addition, a temperature sensor that measures a temperature of the electrode terminal is fixed to the substrate. Accordingly, even vibration occurs in the battery, a state in which the fixing unit and the electrode terminal stably come into contact with each other can be maintained. In addition, the fixing unit is formed of a thermally conductive material, and thus the temperature sensor can measure the temperature of the electrode terminal, that is, the temperature of the battery through the fixing unit in a stable and accurate manner.

According to an eighth aspect of the invention, there is provided a battery module including the battery state monitoring device according to any one of the aspects, and a battery.

In this battery module, the first interconnector connected to the positive electrode end of the sensor and the second interconnector connected to the negative electrode end of the sensor are disposed to extend along one side of a circumferential direction of the through-hole, and thus a direction of a current flowing through the first interconnector and a direction of a current flowing through the second interconnector become opposite to each other.

Accordingly, signals generated due to noise have directions opposite to each other in accordance with respective magnetic fields that occur in the first interconnector and the second interconnector, and cancel each other out, and thus noise can be reduced.

Effect of the Invention

According to the battery state monitoring device and the battery module having the battery state monitoring device, in a case where the battery enters an abnormal state, noise can be reduced while suppressing an effect on other batteries due to a gas blown out from the inside of the battery.

DETAILED DESCRIPTION OF THE INVENTION

Hereinafter, a battery module according to an embodiment of the invention will be described.

Figure 1:
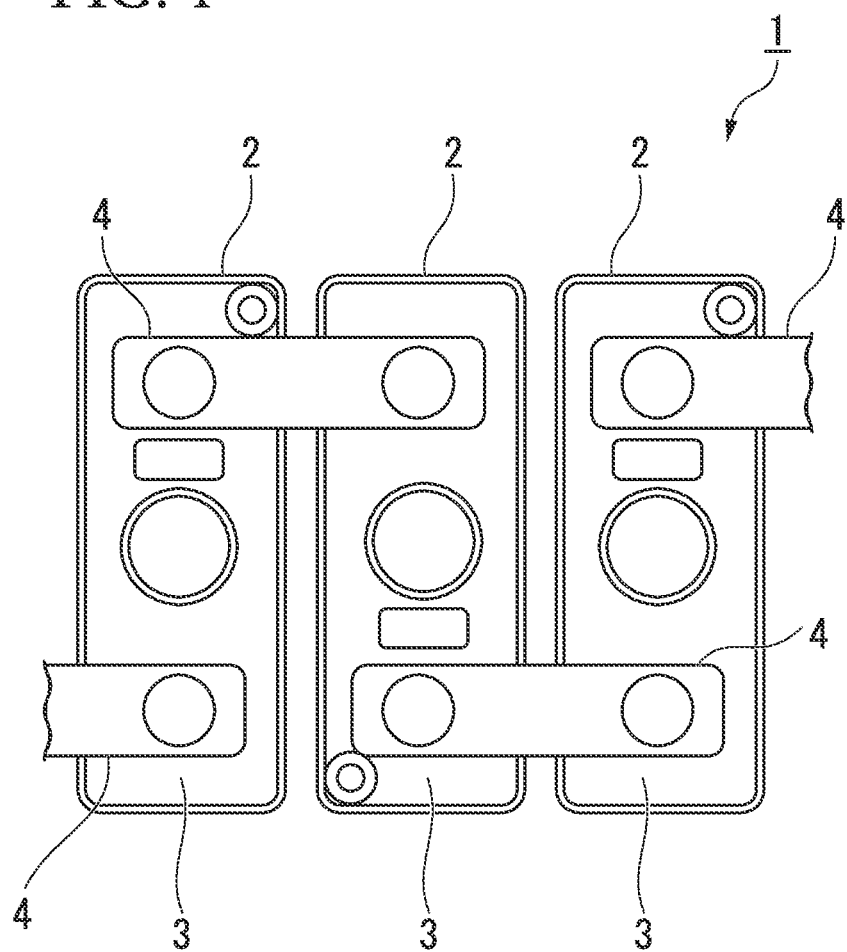
FIG. 1 is a schematic top view of a battery module according to an embodiment of the invention.

As shown in FIG. 1, the battery module 1 includes a plurality of batteries 2, a battery state monitoring device 3 that measures a temperature and the like of the battery 2, and a bus bar 4 that electrically connects the plurality of batteries 2. In addition, in this embodiment, as each of the batteries 2, a lithium ion secondary battery will be described as an example.

First, the battery 2 will be described.

Figure 2:
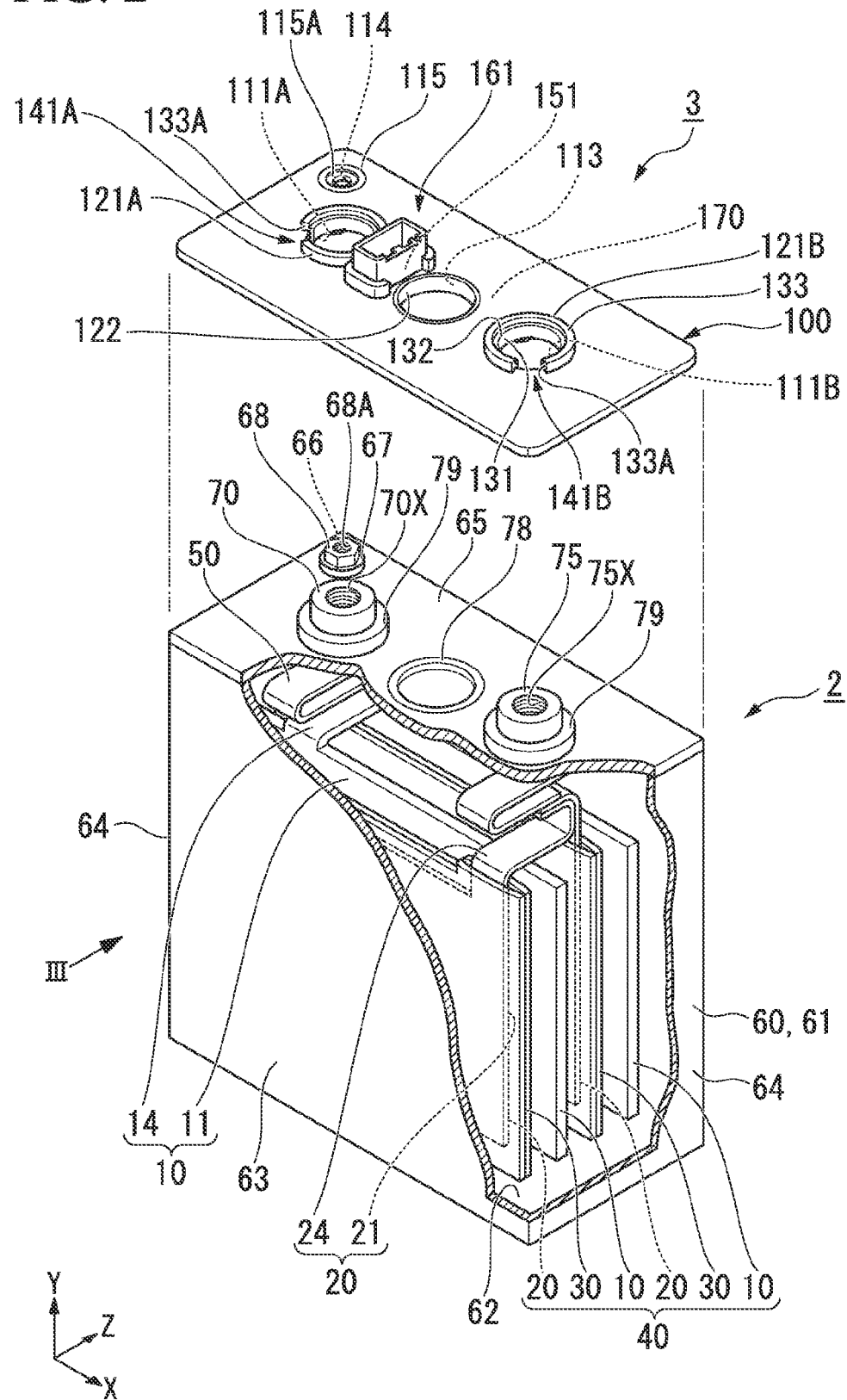
FIG. 2 is a cut-away perspective view of a main portion of a battery that constitutes a battery module according to the embodiment of the invention.

As shown in FIG. 2, the battery 2 includes a plurality of positive electrode plates 10, a plurality of negative electrode plates 20, a separator 30 that covers each of the negative electrode plates 20, an electrolyte, and a battery case 60. The battery case 60 is a metal case that contains the positive electrode plates 10, the negative electrode plates 20, the electrolyte, and the separator 30.

Each of the electrode plates 10 includes a polar plate main body 11 and a tab 14, and each of the electrode plates 20 includes a polar plate main body 21 and a tab 24. The tab 14 or 24 extends from an edge of a core material of the polar plate main body 11 or 21. Each of the polar plate main bodies 11 and 21 is constituted by adhering an active material or the like to a rectangular core material such as aluminum foil and copper foil. The polar plate main body 21 of the negative electrode plate 20 is completely covered with the separator 30. Part of the tab 24 of the negative electrode plate 20 is exposed from the separator 30.

The plurality of positive electrode plates 10, and the plurality of negative electrode plates 20, each being covered with the separator 30, are alternately stacked in such a manner that the tabs 14 and 24 protrude in the same direction, whereby an electrode stacked body 40 is formed.

In a state in which the plurality of positive electrode plates 10 and the plurality of negative electrode plates 20 are stacked, the positive electrode tab 14 and the negative electrode tab 24 are lined up in a direction perpendicular to a stacking direction.

Here, the stacking direction in which the plurality of positive electrode plates 10 and the plurality of negative electrode plates 20 are stacked is set as a Z direction. A direction which is perpendicular to the Z direction and in which the positive electrode tab 14 and the negative electrode tab 24 are lined up is set as an X direction. A direction that is perpendicular to the Z direction and the X direction is set as a Y direction. As shown in FIG. 2, each of arrow directions of the XYZ coordinate is set as a (+) side.

The battery case 60 includes a case main body 61 and a cover 65 that covers a rectangular opening of the case main body 61. The case main body 61 has a rectangular containing concave portion in which the electrode stacked body 40 is contained.

The case main body 61 includes a pair of first side plate 63, a pair of second side plates 64, and a rectangular bottom plate 62. The pair of first side plates 63 opposite to each other and the pair of second side plates 64 opposite to each other form a rectangular shape. These plates 62, 63, and 64 constitute the containing concave portion.

Here, the pair of first side plates 63 is opposite to each other in the Z direction. The pair of second side plates 64 is opposite to each other in the X direction.

In addition, the opening of the case main body 61 is formed on a (+)Y side with respect to the bottom plate 62.

The cover 65 has a rectangular plate shape in correspondence with the rectangular opening of the case main body 61. A positive electrode terminal 70 and a negative electrode terminal 75 are fixed to the cover 65 through an insulating material 79. Female screws 70X and 75X are formed in the positive electrode terminal 70 and the negative electrode terminal 75, respectively.

Further, in the cover 65, a safety valve 78, which operates when a pressure inside the battery case 60 reaches a predetermined pressure or higher, is provided at an intermediate position between the positive electrode terminal 70 and the negative electrode terminal 75.

Here, the positive electrode terminal 70, the negative electrode terminal 75, and the safety valve 78 are lined up in the X direction. In addition, the positive electrode terminal 70 and the negative electrode terminal 75 protrude from the cover 65 toward the (+)Y direction.

In addition, an injection port 66, through which the electrolyte is put into the inside of the case main body 61, is provided in the vicinity of a corner on a (+)Z side and a (−)X side among four corners of the rectangular plate-shaped cover 65. However, after the electrolyte is put into the inside of the battery case 60 through the injection port 66, a port cover 67 is provided on a (+)Y side of the injection port 66, and a bolt 68 is screwed into the port cover 67 to seal the injection port 66. In the port cover 67, a female screw 68A for the bolt 68 is formed.

In addition, in this embodiment, the positive electrode terminal 70 is formed of aluminum. The negative electrode terminal 75 is formed of copper.

Next, the battery state monitoring device 3 that measures the temperature and the like of the battery 2 that is configured as described above will be described in detail.

Figure 3:
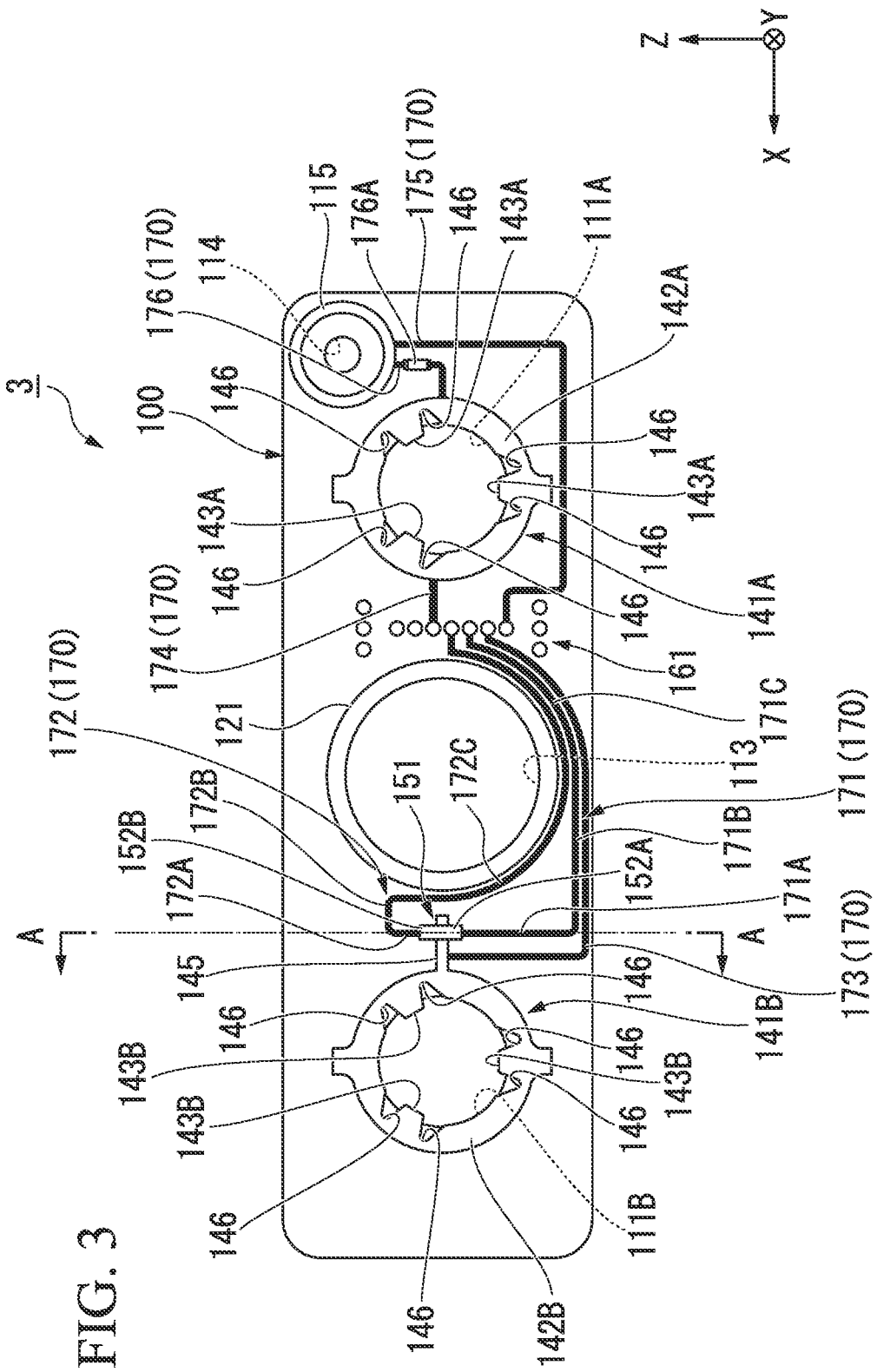
FIG. 3 is a bottom view of a battery state monitoring device that constitutes the battery module according to the embodiment of the invention.

As shown in FIGS. 2 and 3, the battery state monitoring device 3 includes a substrate 100, a positive side fixing unit 141A and a negative side fixing unit 141B (fixing units), a temperature sensor 151 (sensor) that measures a temperature of the negative electrode terminal 75, a connector 161 that is provided to a substrate 100, and a plurality of interconnectors 170 that are connected to the connector 161. The positive side fixing unit 141A and the negative side fixing unit 141B (fixing units) are attached to the positive electrode terminal 70 and the negative electrode terminal 75 (electrode terminal) of the battery 2, respectively.

The substrate 100 is an approximately rectangular plate-shaped member. The length of the substrate 100 in the X direction is approximately the same as the length of the case main body 61 in the X direction. The length of the substrate 100 in the Z direction is approximately the same as the length of the case main body 61 in the Z direction. In addition, the shape of the substrate 100 may be any shape as long as the positive electrode terminal 70 and the negative electrode terminal 75 may be attached, and it is not necessarily the same as that of the case main body 61 in the X direction and Z direction.

The substrate 100 is disposed to be opposite to a (+)Y side of the cover 65 of the battery 2.

Here, a surface of the substrate 100 on the (+)Y side is set as a front surface. A surface of the substrate 100 on a (−)Y side in which the battery 2 is disposed is set as a rear surface.

Figure 4:
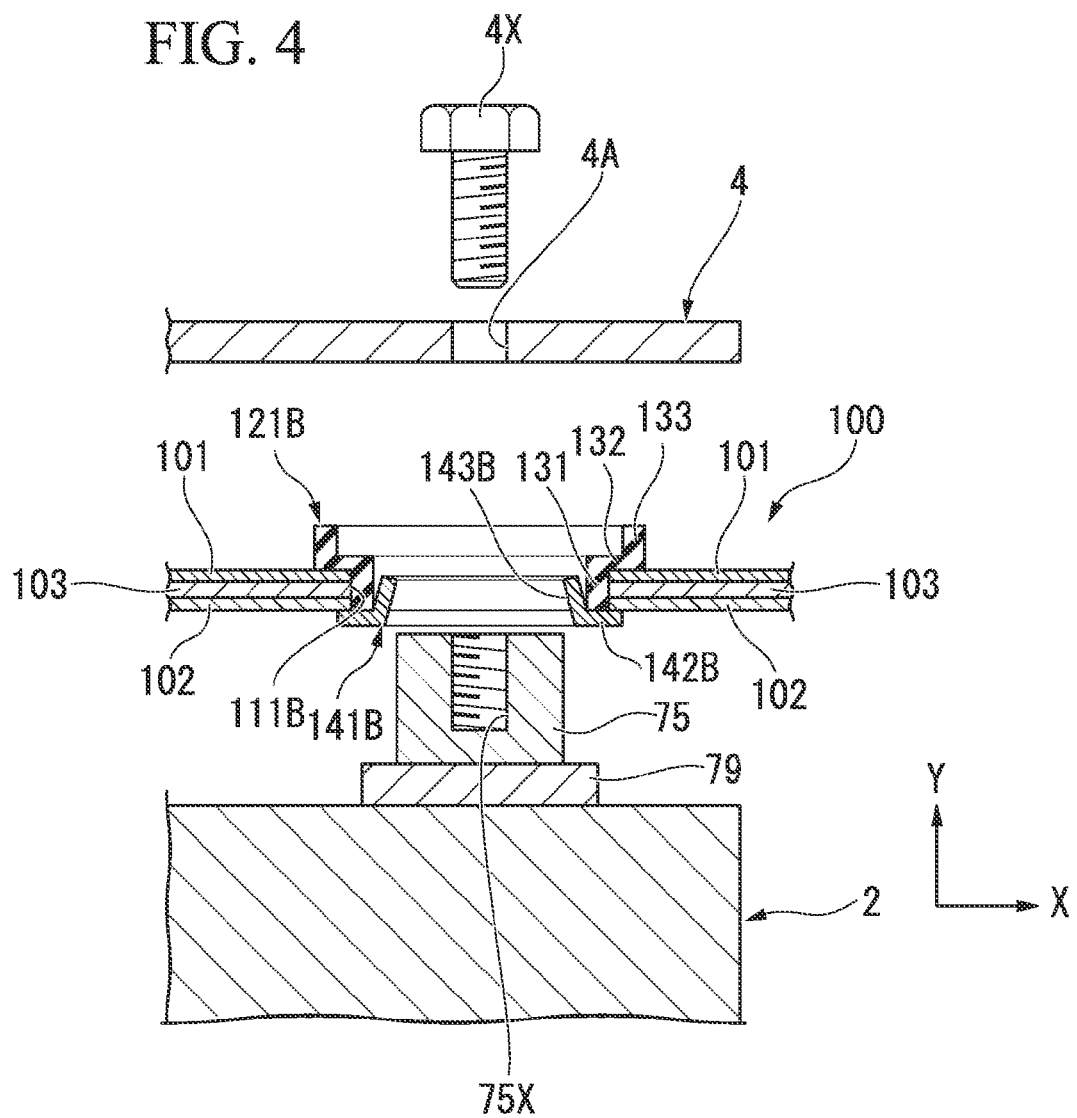
FIG. 4 is an exploded cross-sectional view of the main portion of the battery module according to the embodiment of the invention.

As shown in FIG. 4, the substrate 100 includes a front layer 101 that forms a front surface, a rear layer 102 that forms a rear surface, and a shield layer 103 that is stacked between the front layer 101 and the rear layer 102.

The shield layer 103 is formed of an electrically conductive material. In this embodiment, the shield layer 103 is formed of copper as an example of the electrically conductive material.

As shown in FIGS. 2 and 3, a positive side insertion hole 111A through which the positive electrode terminal 70 is inserted, and a negative side insertion hole 111B (terminal insertion hole) through which the negative electrode terminal 75 is inserted are formed in the substrate 100. In addition, the hole 113 (through-hole) for a safety valve is formed in the substrate 100 at a position that is opposite to the safety valve 78 of the battery 2. The positive side insertion hole 111A, the negative side insertion hole 111B, and the hole 113 for the safety valve are through-holes having an approximately circular opening.

In addition, a through-hole 114 for injection is formed in the substrate 100 at a position corresponding to the injection port 66 formed in the cover 65. An edge member 115 formed of a conductor is provided along an edge of the through-hole 114. A female screw 115A is formed in the edge member 115.

Details will be described later, but in a state in which the battery state monitoring device 3 is attached to the battery 2, a bolt (not shown) is screwed into the female screw 115A of the edge member 115 and the female screw 68A of the bolt 68 for the port cover 67 provided to the injection port 66.

Figure 5:
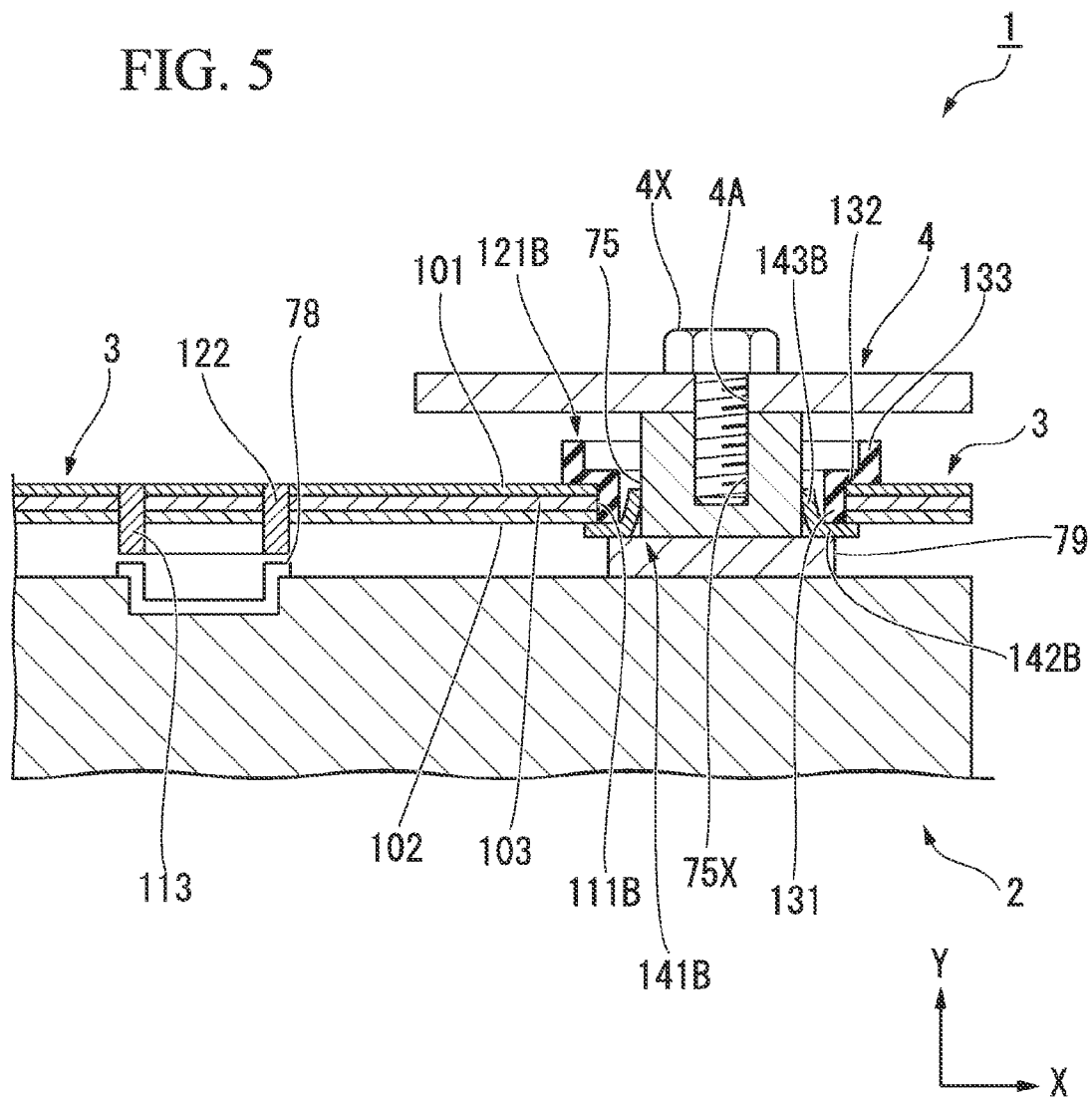
FIG. 5 is a cross-sectional view of the main portion of the battery module according to the embodiment of the invention.

Further, as shown in FIGS. 2 and 5, the substrate 100 includes a positive side insulating protrusion 121A, a negative side insulating protrusion 121B, and a tubular portion 122. The positive side insulating protrusion 121A and the negative side insulating protrusion 121B protrude from the periphery of the positive side insertion hole 111A and the negative side insertion hole 111B toward a surface side of the substrate 100, that is, the (+)Y side. The tubular portion 122 extends from the periphery of the hole 113 for the safety valve toward an opposite safety valve side, that is, a (−)Y side. The tubular portion 122 is formed of a material having high heat resistance. In addition, in this embodiment, the tubular portion 122 may be appropriately omitted.

The negative side insulating protrusion 121B is formed of an insulating material. In this embodiment, the negative side insulating protrusion 121B is formed of a resin. The negative side insulating protrusion 121B includes a wall portion 131, a flange portion 132, and an erected wall portion 133. The wall portion 131 is disposed at the periphery of the negative side insertion hole 11113. The flange portion 132 extends from the (+)Y side of the wall portion 131 toward an outer side of the negative side insertion hole 111B in a radial direction. The erected wall portion 133 is erected from an outer side of the flange portion 132 in a radial direction toward the (+)Y direction, and a notched portion 133A is formed at a part of the periphery of the erected wall portion 133. In the erected wall portion 133 has a C-shaped cross-section in an XY plane.

In addition, in this embodiment, the positive side insulating protrusion 121A has the same configuration as the negative side insulating protrusion 121B, and thus description thereof will be omitted.

The positive side fixing unit 141A is provided at the periphery of the positive side insertion hole 111A. In addition, the negative side fixing unit 141B is provided at the periphery of the negative side insertion hole 111B.

The negative side fixing unit 141B is formed of a thermally conductive and electrically conductive material. In this embodiment, the negative side fixing unit 141B is formed of a metal such as copper. According to this, the negative side fixing unit 141B functions as a temperature measuring terminal that measures a temperature of the negative electrode terminal 75, and also functions as a terminal-electric-potential measuring terminal that measures an electric potential of the negative electrode terminal 75.

In addition, the positive side fixing unit 141A is formed of an electrically conductive material. In this embodiment, the positive side fixing unit 141A is formed of a metal such as copper. According to this, the positive side fixing unit 141A functions as a terminal-electric-potential measuring terminal that measures an electric potential of the positive electrode terminal 70.

As shown in FIGS. 3 and 4, the negative side fixing unit 141B is formed in a circular shape. The negative side fixing unit 141B includes a negative side circular portion 142B that is provided on the rear surface of the substrate 100, and three negative side pressing portions 143B that are formed from the negative side circular portion 142B toward the (+)Y direction.

A fixing unit connection end 145, which is formed of a thermally conductive material and which extends toward an outer side of the negative side insertion hole 111B in a radial direction, is connected to the negative side circular portion 142B. The fixing unit connection end 145 thermally connects the negative side fixing unit 141B and a temperature sensor 151 to be described later.

As shown in FIG. 5, each of the negative side pressing portions 143B is formed to face the (+)Y direction as it goes from the negative side circular portion 14213 toward an inner side of the negative side insertion hole 111B in a radial direction.

When the negative electrode terminal 75 is inserted through the negative side insertion hole 111B, the three negative side pressing portions 143B are elastically deformed to spread toward an outer side of the negative side insertion hole 111B in a radial direction, and enter a state in which the negative side pressing portions 143B are disposed along the periphery of the negative electrode terminal 75. According to this, each of the three negative side pressing portions 143B comes into contact with the negative electrode terminal 75 and presses the negative electrode terminal 75 toward an inner side in a radial direction. According to this, the negative side fixing unit 141B is attached to the negative electrode terminal 75. In addition, the number of the negative side pressing portions 143B is not limited to three. The number of the negative side pressing portions 143B may be appropriately determined in consideration of the size and shape of the negative electrode terminal 75 for relatively strong attachment between the negative side fixing unit 141B and the negative electrode terminal 75.

In addition, a concave portion 146, which is recessed toward an outer side of the negative side insertion hole 111B in a radial direction, is formed at both sides of the negative side pressing portions 143B in a circumferential direction.

Similar to the negative side fixing unit 141B, the positive side fixing unit 141A includes a positive side circular portion 142A and a positive side pressing portion 143A. In addition, in this embodiment, the positive side fixing unit 141A has the same configuration as the negative side fixing unit 141B except that the fixing unit connection end 145 is not provided to the positive side fixing unit 141A, and thus description thereof will be omitted.

As shown in FIG. 3, the temperature sensor 151 (thermistor) is fixed to a surface on which the battery 2 is disposed, that is, the rear surface between the front and rear surfaces of the substrate 100.

Figure 6:
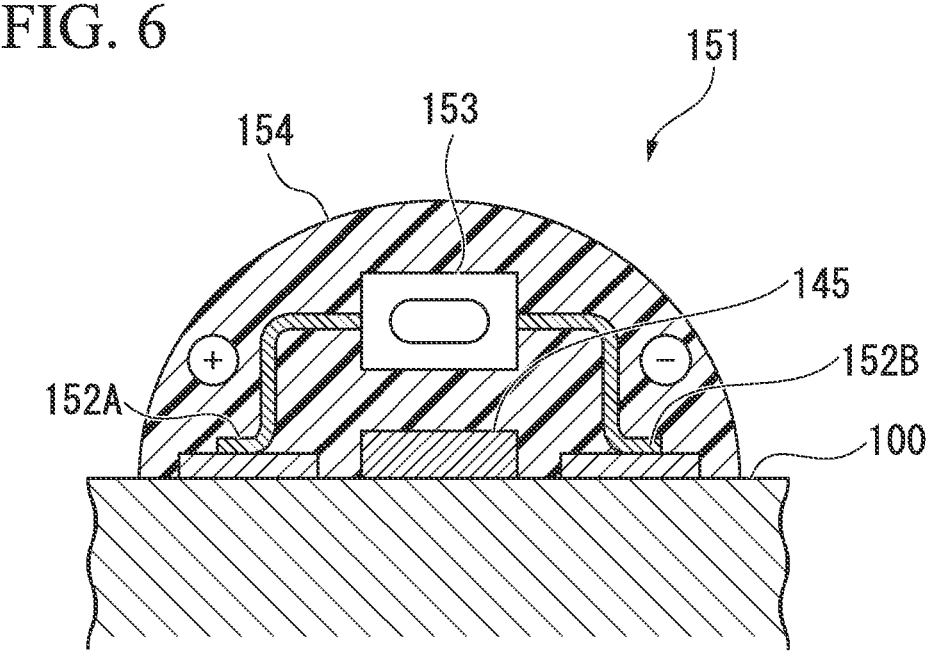
FIG. 6 is a cross-sectional view taken along a line A-A of FIG. 3.

As shown in FIG. 6, the temperature sensor 151 includes a main body portion 153 in which a resistor whose resistance value varies in accordance with a temperature is embedded, a positive electrode side end 152A, and a negative electrode side end 152B. A first end of the positive electrode side end 152A and the negative electrode side end 152B is connected to the main body portion 153. A second end of the positive electrode side end 152A and the negative electrode side end 15213 is fixed to the rear surface of the substrate 100.

In addition, the main body portion 153 is disposed to have a gap with the fixing unit connection end 145 provided to the substrate 100. The fixing unit connection end 145 and the temperature sensor 151 are covered with an insulating material 154. In this embodiment, fixing unit connection end 145 and the temperature sensor 151 are covered with silicon as an example of the insulating material.

The temperature sensor 151 and the negative side fixing unit 141B are thermally connected by the fixing unit connection end 145. In addition, in a state in which the negative electrode terminal 75 is inserted through the negative side insertion hole 111B, the temperature sensor 151 can measure a temperature of the negative electrode terminal 75 through the fixing unit connection end 145 that is connected to the negative side fixing unit 141B.

In addition, in this embodiment, copper that constitutes the negative electrode terminal 75 has a thermal conductivity higher than aluminum that constitutes the positive electrode terminal 70, and thus the temperature sensor 151 is provided on a negative electrode terminal 75 side of the substrate 100.

Accordingly, in a case where the material that forms the positive electrode terminal 70 has a thermal conductivity higher than that of the material that forms the negative electrode terminal 75, it is preferable that the temperature sensor 151 be provided on positive electrode terminal 70 side of the substrate 100.

As shown in FIG. 3, in the substrate 100, the connector 161 is provided on a side opposite to the temperature sensor 151 with the hole 113 for the safety valve interposed between the connector 161 and the temperature sensor 151 in consideration of a space of the substrate 100. In this embodiment, the connector 161 is provided between the hole 113 for the safety valve and the positive side insertion hole 111A.

In this manner, the temperature sensor 151, the hole 113 for the safety valve, and the connector 161 are lined up in the (−)X direction in this order. In other words, a line-up direction from the temperature sensor 151 to the connector 161 is set to the (−)X direction.

In addition, the connector 161 is configured to be connected to a control device (not shown) through an interconnection (not shown).

The plurality of interconnectors 170 are provided on a surface on a battery 2, that is, the rear surface between the front and rear surfaces of the substrate 100. The plurality of interconnectors 170 include a first interconnector 171 that is connected to the positive electrode side end 152A of the temperature sensor 151, and a second interconnector 172 that is connected to the negative electrode side end 152B of the temperature sensor 151.

On the substrate 100, a first end of the first interconnector 171 is connected to the positive electrode side end 152A of the temperature sensor 151, and a second end of the first interconnector 171 is connected to the connector 161. The first interconnector 171 is disposed to extend along a part of the periphery of the hole 113 for the safety valve. Specifically, the first interconnector 171 includes an interconnection portion 171A that extends from the positive electrode side end 152A toward the (−)Z direction, an approximately linear interconnection portion 171B that is bent from an end of the interconnection portion 171A and extends toward the (−)X direction, and an interconnection portion 171C that extends from an end of the interconnection portion 171B along an arc shape of the hole 113 for the safety valve.

On the substrate 100, a first end of the second interconnector 172 is connected to the negative electrode side end 152B of the temperature sensor 151, and a second end of the second interconnector 172 is connected to the connector 161. The second interconnector 172 is disposed to extend along a part of the periphery of the hole 113 for the safety valve. Specifically, the second interconnector 172 includes an interconnection portion 172A that extends from the negative electrode side end 152B toward the (+)Z direction, an approximately linear interconnection portion 172B that is bent from an end of the interconnection portion 172A and extends toward the (−)X direction, and an interconnection portion 172C that extends from an end of the interconnection portion 172B along an arc shape of the hole 113 for the safety valve.

In this manner, the first interconnector 171 and the second interconnector 172 are disposed to extend along each other at the periphery of the hole 113 for the safety valve, that is, to extend along the (−)Z side of the hole 113 for the safety valve at the substrate 100. The first interconnector 171 and the second interconnector 172 are disposed to extend along either a line-up direction or a direction perpendicular to the hole 113 for the safety valve. In addition, the line-up direction represents a direction in which the temperature sensor 151, the hole 113 for the safety valve, and the connector 161 are lined up.

In addition, in this embodiment, the configuration in which the first interconnector 171 and the second interconnector 172 are disposed to extend along a part of the periphery of the hole 113 for the safety valve represents a configuration in which the first interconnector 171 and the second interconnector 172 are arranged from a side in which the temperature sensor 151 is provided to an opposite side with the hole 113 for the safety valve set as a boundary in the longitudinal direction (X direction) of the substrate 100, and the first interconnector 171 and the second interconnector 172 are disposed to extend along one direction ((−)Z direction) with respect to the hole 113 for the safety valve.

In addition, the interconnection portion 171C of the first interconnector 171 and the interconnection portion 172C of the second interconnector 172 are adjacent to each other and are disposed to be approximately parallel with each other.

In addition, in the first interconnector 171, a current flows from the connector 161 toward the positive electrode side end 152A. In the second interconnector 172, a current flows from the negative electrode side end 152B the connector 161. Accordingly, a direction of the current flowing through the first interconnector 171 and a direction of the current flowing through the second interconnector 172 are opposite to each other.

Further, the interconnector 170 includes a negative electrode interconnector 173 that is connected to the fixing unit connection end 145 provided to the negative side circular portion 142B of the negative side fixing unit 141B, a positive electrode interconnector 174 that is connected to the positive side circular portion 142A of the positive side fixing unit 141A, a battery case interconnector 175 that is connected to the edge member 115 provided to the through-hole 114 for injection, and an interconnector 176 that connects the edge member 115 and the positive side circular portion 142A. The resistive element 176A is provided to the interconnector 176.

Here, when the interconnector 176, which connects the edge member 115 and the positive side circular portion 142A, is provided on the substrate 100, the positive electrode terminal 70 that is connected to the positive side fixing unit 141A and the battery case 60 may have substantially the same electric potential. Accordingly, an inner surface of the battery case 60 which comes into contact with the electrolyte is set to an oxidizing atmosphere, and thus the electric potential of the battery case 60 can be maintained to an electric potential region capable of preventing alloying with a lithium ion into LiAl.

In addition, when the resistive element 176A is provided, for example, even when an abnormality such as short-circuit between the negative electrode terminal 75 and the battery case 60 occurs, a current that flows from the positive electrode terminal 70 to the battery case 60 can be limited to a minute current, for example, in the order of mA. A resistance value of the resistive element 176A (pull-up resistive element) may be appropriately and freely set in consideration of a value of a current that may flow through the battery 2, and the like. For example, a resistive element of 1 kΩ may be used.

Next, the bus bar 4 will be described.

As shown in FIGS. 1 and 5, the bus bar 4 is a member that electrically connects electrodes of adjacent batteries 2 to each other. A through-hole 4A through which a bolt 4X penetrates is formed in the bus bar 4, and the through-hole 4A is formed at a position corresponding to the positive electrode terminal 70 and the negative electrode terminal 75 of the battery 2. The bolt 4X is inserted through the through-hole 4A, and the bolt 4X is screwed into female screws 70X and 75X formed in the positive electrode terminal 70 or the negative electrode terminal 75, whereby the bus bar 4 is connected to an electrode of the battery 2.

Next, description will be made with respect to assembly of the battery module 1 which is configured as described above.

First, the battery state monitoring device 3 is disposed on the (+)Y side of the battery 2 in such a manner that the positive side insertion hole 111A formed in the battery state monitoring device 3 is allowed to face the positive electrode terminal 70 of the battery 2, the negative side insertion hole 111B is allowed to face the negative electrode terminal 75, and the hole 113 for the safety valve is allowed to face the safety valve 78 of the battery 2.

At this time, the positive side pressing portions 143A are formed from the positive side circular portion 142A toward the (+)Y direction, and thus the positive side pressing portions 143A and the positive electrode terminal 70 correspond to each other. The negative side pressing portions 143B are formed from the negative side circular portion 142B toward the (+)Y direction, and thus the negative side pressing portions 143B and the negative electrode terminal 75 correspond to each other. As a result, the substrate 100 is positioned with respect to the battery 2. It is easy for the positive electrode terminal 70 to be reliably and easily positioned at the positive side insertion hole 111A and to be inserted therethrough. In addition, it is easy for the negative electrode terminal 75 to be reliably and easily positioned at the negative side insertion hole 111B and to be inserted therethrough.

In this state, the positive electrode terminal 70 is allowed to be inserted through the positive side insertion hole 111A, and the negative electrode terminal 75 is allowed to be inserted through the negative side insertion hole 111B. At this time, the three negative side pressing portions 143B of the negative side fixing unit 141B are elastically deformed to spread toward an outer side of the negative side insertion hole 111B in a radial direction. According to this, each of the three negative side pressing portions 143B comes into contact with the negative electrode terminal 75 and presses the negative electrode terminal 75 toward an inner side of the negative side insertion hole 111B in a radial direction. Accordingly, the negative side fixing unit 141B may be attached with respect to the negative electrode terminal 75.

Here, when the negative electrode terminal 75 is inserted through the negative side insertion hole 111B, the negative side pressing portions 143B of the negative side fixing unit 141B move in the (−)Y direction while coming into contact with an outer peripheral surface of the negative electrode terminal 75. Accordingly, even when foreign substances and the like are present on the outer peripheral surface of the negative electrode terminal 75 of the battery 2, the foreign substances are removed from the outer peripheral surface of the negative electrode terminal 75 along with the contact movement of the negative side pressing portions 143B.

Similarly, the positive side pressing portion 143A of the positive side fixing unit 141A also presses the positive electrode terminal 70 toward an inner side in a radial direction.

In addition, a bolt (not shown) is screwed into the female screw 151A of the edge member 115 provided to the through-hole 114 for injection which is formed in the substrate 100, and the female screw 68A of the bolt 68 that is screwed into the injection port 66 of the battery case 60. According to this, the battery state monitoring device 3 is attached to the battery 2.

In a state in which the battery state monitoring device 3 is attached to the battery 2, the negative side fixing unit 141B that is formed of a thermally conductive material is attached to the negative electrode terminal 75 on the negative electrode terminal 75 side of the substrate 100. In addition, the fixing unit connection end 145 that is connected to the negative side circular portion 142B of the negative side fixing unit 141B and is formed of a thermally conductive material thermally connects the temperature sensor 151 and the negative side fixing unit 141B. Accordingly, the negative electrode terminal 75 and the temperature sensor 151 are thermally connected to each other through the negative side fixing unit 141B and the fixing unit connection end 145.

Further, the negative side fixing unit 141B is formed of an electrically conductive material. Accordingly, the negative electrode terminal 75 and the connector 161 are electrically connected to each other through the negative side fixing unit 141B and the negative side interconnector 173.

In addition, on the positive electrode terminal 70 side of the substrate 100, the positive side fixing unit 141A formed of an electrically conductive material is attached to the positive electrode terminal 70. Accordingly, the positive electrode terminal 70 and the connector 161 are electrically connected to each other through the positive side fixing unit 141A and the positive electrode interconnector 174.

In addition, at the battery case 60, the battery case 60 and the connector 161 are electrically connected to each other through the bolt 68 that is screwed into the injection port 66, the edge member 115 that is provided to the substrate 100 and is formed of a conductor, a bolt (not shown) that is screwed into the female screw 68A of the bolt 68 and the female screw 115A of the edge member 115, and the interconnector 170.

Next, the connector 161 of the battery state monitoring device 3 attached to the battery 2 and a control device (not shown) are connected to each other through an interconnector.

In addition, the plurality of batteries 2 are arranged, and the bolt 4X is inserted through the through-hole 4A formed in the bus bar 4, and the bolt 4X is screwed into the female screws 70X and 75X that are formed in the positive electrode terminal 70 and the negative electrode terminal 75 of the batteries 2. According to this, the battery module 1 may be assembled.

In the battery module 1 that is configured in this manner, as described above, a direction of a current flowing through the first interconnector 171 and a direction of a current flowing through the second interconnector 172 are opposite to each other. Accordingly, directions of magnetic fields in the first interconnector 171 and the second interconnector 172 which occur due to the same noise become opposite to each other and cancel each other out, and thus noise can be reduced.

In addition, the first interconnector 171 and the second interconnector 172 are provided on a surface of the substrate 100 on a battery 2 at the substrate 100. Accordingly, an effect of noise from a side opposite ((−)Y side of the substrate 100) to the battery 2 can be suppressed to the minimum.

Further, the substrate 100 includes the shield layer 103 that is an electrically conductive material capable of shielding an electric field and a magnetic field, and thus the first interconnector 171 and the second interconnector 172 that are provided on a lower surface ((−Y) side of the substrate 100) can further suppress an effect of a noise from an upper surface ((+)Y side of the substrate 100).

In addition, in a case where a gas is blown out from the safety valve 78 of the battery 2, the gas passes through the tubular portion 122 that is disposed to be opposite to the safety valve 78 and flows from the hole 113 for the safety valve toward a side opposite ((+)Y side of the substrate 100) to the battery 2. Here, since the tubular portion 122 is formed of a material having high heat resistance, at the inside of the tubular portion 122, the gas can be reliably guided from a lower direction toward an upper direction. Accordingly, flowing of the gas toward other adjacent batteries 2 can be suppressed, and thus an adverse effect on the other batteries 2 can be suppressed.

In addition, when the negative electrode terminal 75 is inserted through the negative side insertion hole 111B, the negative side fixing unit 141B is attached to the negative electrode terminal 75. Further, the negative electrode terminal 75 and the temperature sensor 151 are thermally connected to each other.

In addition, since the negative side fixing unit 141B and the negative side pressing portions 143B press the negative electrode terminal 75 toward an inner side of the negative side insertion hole 111B in a radial direction, a fixed state between the negative side pressing portions 143B and the negative electrode terminal 75 can be maintained and contact properties between these can be increased.

Further, the three negative side pressing portions 143B of the negative side fixing unit 141B enter a state of being disposed along the outer periphery of the negative electrode terminal 75, and thus negative electrode terminal 75 may be reliably pressed along the circumferential direction.

Accordingly, for example, even vibration occurs in the battery 2, a relational position between the negative electrode terminal 75, the negative side fixing unit 141B, and the temperature sensor 151 does not vary, and thus the temperature of the negative electrode terminal 75 and the temperature inside the battery 2 can be stably and accurately measured.

In addition, the positive electrode terminal 70 and the negative electrode terminal 75, and the connector 161 are electrically connected to each other through the positive electrode terminal 70, the negative electrode terminal 75, the positive electrode interconnector 174, and the negative electrode interconnector 173, and thus a voltage between the positive electrode terminal 70 and the negative electrode terminal 75 can be recognized.

In addition, the battery case 60 and the connector 161 are electrically connected to each other through the bolt 68 that is screwed into the injection port 66, the edge member 115 that is provided to the substrate 100 and is formed of a conductor, a bolt (not shown) that is screwed into the female screw 68A of the bolt 68 and the female screw 115A of the edge member 115, and the interconnector 170. Accordingly, an electric potential of the battery case 60 can be recognized.

In addition, the negative side fixing unit 141B serves as a temperature measuring terminal that measures a temperature of the negative electrode terminal 75, and a terminal-electric-potential measuring terminal that measures an electric potential of the negative electrode terminal 75. Accordingly, the number of components of a measuring device can be suppressed compared to a case in which the temperature measuring terminal and the terminal-electric-potential measuring terminal are separately provided.

In addition, the shape, combination, and the like of the respective constituent members shown in the above-described embodiment are illustrative only, and various modifications may be made in a range not departing from the gist of the invention on the basis of the requirements of design.

For example, in this embodiment, the lithium secondary battery has been described as an example of the battery 2. However, the invention is not limited thereto, and the battery 2 may be a battery in which the electrode terminal is disposed on one surface of the battery case. The type and shape of the battery may be appropriately modified.

In addition, in this embodiment, a case in which the connector 161 is provided on the substrate 100 has been described as an example, but the invention is not limited thereto. The invention may employ a configuration in which the first interconnector 171 and the second interconnector 172 extend along a part of the periphery of the hole 113 for the safety valve and are disposed on the substrate 100, and the first interconnector 171 and the second interconnector 172 are taken out from one site of the substrate 100 together with, for example, other interconnectors such as the positive electrode interconnector 174, the negative electrode interconnector 173, and the battery case interconnector 175.

In addition, in this embodiment, the negative electrode interconnector 173 and the positive electrode interconnector 174 are provided to the substrate 100 to measure a terminal electric potential using the positive side fixing unit 141A and the negative side fixing unit 141B. However, the invention is not limited thereto, and these interconnectors may be omitted. Similarly, the battery case interconnector 175 may be omitted.

In addition, in this embodiment, the first interconnector 171 and the second interconnector 172 are provided on a surface of the substrate 100 on a battery 2 ((−)Y side of the substrate 100), and thus at the substrate 100, an effect of noise from a side opposite ((+)Y side of the substrate 100) to the battery 2 can be suppressed to the minimum. For example, under a circumstance in which it is not likely to be susceptible to an effect of a noise from the outside, the first interconnector 171 and the second interconnector 172 may be provided on a surface of the substrate 100 on a side opposite ((+)Y side of the substrate 100) to the battery 2.

In addition, in this embodiment, a case in which the substrate 100 includes the shield layer 103 that is an electrically conductive material capable of shielding an electric field and a magnetic field has been described as an example. However, the invention is not limited thereto, and the shield layer 103 may be omitted.

In addition, in this embodiment, description has been made using the thermistor as the sensor. However, the invention is not limited thereto, and the sensor may be a member that converts measured data such as a temperature into an electric signal and outputs the electric signal.

In addition, in this embodiment, description has been made with respect to a case in which the substrate 100 is provided with the tubular portion 122 disposed to be opposite to the safety valve 78 as an example. However, the invention is not limited thereto, and the tubular portion 122 may be omitted.

In addition, in this embodiment, description has been made with respect to a case in which the negative side insertion hole 111B is formed on the substrate 100, and the sensor 151 is provided to the negative side fixing unit 141B that is provided to the negative side insertion hole 111B as an example. However, the invention is not limited thereto, and the sensor 151 may be provided to the substrate 100 in such a manner that the sensor 151 comes into direct contact with the battery case 60.

INDUSTRIAL APPLICABILITY

According to the battery state monitoring device and the battery module having the battery state monitoring device, noise can be reduced while suppressing an effect of a gas on other batteries and the like.

REFERENCE SIGNS LIST

1: battery module
2: battery
3: battery state monitoring device
75: negative electrode terminal (electrode terminal)
100: substrate
111B: negative side insertion hole (terminal insertion hole)
113: hole for a safety valve (through-hole)
141B: negative side fixing unit (fixing unit)
145: fixing unit connection end
151: temperature sensor (sensor)
152A: positive electrode side end (positive electrode end)
152B: negative electrode side end (negative electrode end)
161: connector
171: first interconnector
172: second interconnector

What is claimed is:

1. A battery state monitoring device comprising:
a substrate which is formed with a positive side insertion hole, a negative side insertion hole and a through-hole, the positive side insertion hole through which a positive electrode terminal of a battery is inserted, the negative side insertion hole through which a negative electrode terminal the battery is inserted, and the through-hole disposed to be opposite to a safety valve of a battery and formed between the positive side insertion hole and the negative side insertion hole;
a sensor which includes a positive electrode end and a negative electrode end and which is provided on the substrate, the sensor which is positioned between the positive side insertion hole and the through-hole or between the negative side insertion hole and the insertion hole;
a first interconnector which is connected to the positive electrode end of the sensor on the substrate and which is disposed to pass along a part of a periphery of the through-hole; and
a second interconnector which is connected to the negative electrode end of the sensor on the substrate and which is disposed to pass along a part of the periphery of the through-hole, wherein the first interconnector and the second interconnector are disposed to extend along each other at the periphery of the through-hole.

2. The battery state monitoring device according to claim 1, wherein
the first interconnector, the second interconnector, and the sensor are provided on a surface on a battery side among front and rear surfaces of the substrate.

3. The battery state monitoring device according to claim 1, further comprising:
a connector which is provided to the substrate on a side opposite to the sensor with the through-hole interposed between the connector and the sensor, wherein
a first end of the first interconnector is connected to the positive electrode end of the sensor, and a second end of the first interconnector is connected to the connector, and
a first end of the second interconnector is connected to the negative electrode end of the sensor, and a second end of the second interconnector is connected to the connector.

4. The battery state monitoring device according to claim 1, wherein
the substrate includes a shield layer that is formed of an electrically conductive material.

5. The battery state monitoring device according to claim 1, wherein
the sensor is a thermistor including a resistive element in which a resistance value varies in accordance with a temperature.

6. The battery state monitoring device according to claim 1, wherein
the substrate has a tubular portion that extends from the periphery of the through-hole toward the opposite safety valve.

7. The battery state monitoring device according to claim 1, wherein
a positive side fixing unit and a negative side fixing unit which are formed of a thermally conductive material are provided at the periphery of the positive side insertion hole or the negative side insertion hole, the positive side fixing unit comes into contact with the positive electrode terminal in a state in which the positive electrode terminal is inserted through the positive side insertion hole, and is attached the positive electrode terminal, the negative side fixing unit comes into contact with the negative electrode terminal in a state in which the negative electrode terminal is inserted through the negative side insertion hole, and is attached the negative electrode terminal, and
the sensor is fixed to the substrate and measures a temperature of the positive electrode terminal or the negative electrode terminal, via the positive side fixing unit or the negative side fixing unit.

8. A battery module comprising:
a battery state monitoring device comprising:
a substrate which is formed with a positive side insertion hole, a negative side insertion hole and a through-hole, the positive side insertion hole through which a positive electrode terminal of a battery is inserted, the negative side insertion hole through which a negative electrode terminal the battery is inserted, and the through-hole disposed to be opposite to a safety valve of a battery and formed between the positive side insertion hole and the negative side insertion hole;
a sensor which includes a positive electrode end and a negative electrode end and which is provided on the substrate, the sensor which is positioned between the positive side insertion hole and the through-hole or between the negative side insertion hole and the insertion hole;
a first interconnector which is connected to the positive electrode end of the sensor on the substrate and which is disposed to pass along a part of a periphery of the through-hole; and
a second interconnector which is connected to the negative electrode end of the sensor on the substrate and which is disposed to pass along a part of the periphery of the through-hole, wherein the first interconnector and the second interconnector are disposed to extend along each other at the periphery of the through-hole, and
a battery.

9. The battery module according to claim 8, wherein
the first interconnector, the second interconnector, and the sensor are provided on a surface on a battery side among front and rear surfaces of the substrate.

10. The battery module according to claim 8, further comprising:
a connector which is provided to the substrate on a side opposite to the sensor with the through-hole interposed between the connector and the sensor, wherein
a first end of the first interconnector is connected to the positive electrode end of the sensor, and a second end of the first interconnector is connected to the connector, and
a first end of the second interconnector is connected to the negative electrode end of the sensor, and a second end of the second interconnector is connected to the connector.

11. The battery module according to claim 8, wherein
the substrate includes a shield layer that is formed of an electrically conductive material.

12. The battery module according to claim 8, wherein
the sensor is a thermistor including a resistive element in which a resistance value varies in accordance with a temperature.

13. The battery module according to claim 8, wherein
the substrate has a tubular portion that extends from the periphery of the through-hole toward the opposite safety valve.

14. The battery module according to claim 8, wherein
a positive side fixing unit and a negative side fixing unit which are formed of a thermally conductive material are provided at the periphery of the positive side insertion hole or the negative side insertion hole, the positive side fixing unit comes into contact with the positive electrode terminal in a state in which the positive electrode terminal is inserted through the positive side insertion hole, and is attached the positive electrode terminal, and the negative side fixing unit comes into contact with the negative electrode terminal in a state in which the negative electrode terminal is inserted through the negative side insertion hole, and is attached the negative electrode terminal,
the sensor is fixed to the substrate and measures a temperature of the positive electrode terminal or the negative electrode terminal, via the positive side fixing unit or the negative side fixing unit.

\* \* \* \* \*